Feb. 14, 1967 W. H. HUNTLEY, JR., ETAL 3,304,419

SOLID-STATE ANALOG MULTIPLIER CIRCUIT

Filed July 31, 1963

INVENTORS
WRIGHT H. HUNTLEY, JR.
ENN TAMMARU
BY J. E. Rosenblum
ATTORNEY

United States Patent Office 3,304,419
Patented Feb. 14, 1967

3,304,419

SOLID-STATE ANALOG MULTIPLIER CIRCUIT

Wright H. Huntley, Jr., Palo Alto, Calif., and Enn Tammaru, Arlington, Mass., assignors of twenty percent to Wright H. Huntley, Sr.

Filed July 31, 1963, Ser. No. 299,046
4 Claims. (Cl. 235—194)

The present invention relates to an analog multiplier circuit useful, for example, in normalizing, computing, correlation, and functional control applications.

Conventional circuit techniques for multiplication have tended to be limited in both speed of response and accuracy; and some authors have even stated that, in general, if accuracy is increased the speed must be decreased and vice versa.

The object of the present invention is the provision of a simple solid-state multiplier circuit which provides response speeds from D.-C. to several megacycles with excellent accuracy and stability.

Various features and advantages of this invention will become apparent upon a consideration of the following specification, taken in connection with the accompanying drawing, wherein.

Figure 1:
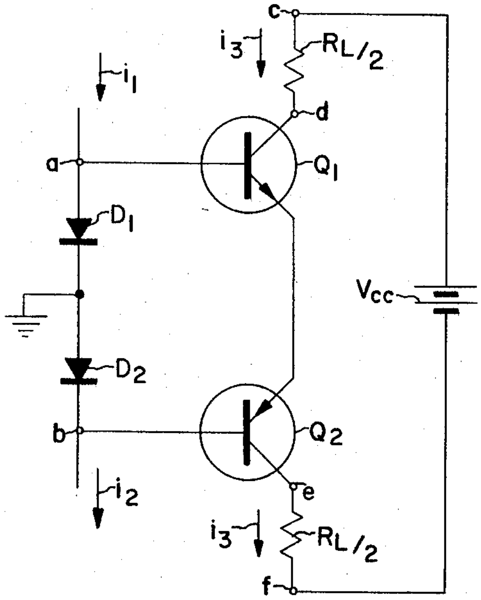
FIGURE 1 is a schematic drawing of a basic multiplier circuit in accordance with the present invention.

The present invention is based upon the identity: $i_1.i_2 \equiv \text{antilog}_y\ (\log_y i_1 + \log_y i_2)$, where $i_1$ and $i_2$ are the input variables, and $y$ is the logarithmic base. Referring to FIGURE 1, means are provided for the steps of (1) converting the inputs $i_1$ and $i_2$ to $\log_y i_1$ and $\log_y i_2$, (2) adding $\log_y i_1$ and $\log_y i_2$, and (3) taking the antilogarithm of the sum.

Step (1) is performed by a pair of semiconductor junction diodes $D_1$, $D_2$. The *v-i* transfer function of such diodes is exponential. Accordingly an input current $i_1$ through $D_1$ generates a voltage $\log_y i_1$ thereacross; and an input current $i_2$ through $D_2$ generates a voltage $\log_y i_2$ thereacross.

Step (2) is performed by connecting opposite polarity terminals of $D_1$ and $D_2$ to a common ground potential and taking the sum of the diode voltages from the remaining terminals *a* and *b*. This arrangement has the advantage of avoiding the severe problems of accuracy and stability which would result if the log signals were separately amplified and then converted to currents for addition.

Step (3) is performed by impressing the log-sum voltage across the base-emitter junctions of a floating input of a complementary pair of transistors $Q_1$ and $Q_2$. The output current in the collectors of these transistors is an exponential function of the base inputs from terminals *a* and *b*, so that the current $i_3$ is the desired antilog (the transistor forward-current transfer ratios ($\beta$) being sufficiently high that no significant portion of $i_1$ or $i_2$ flows in the base circuit of $Q_1$ and $Q_2$). Moreover, the output impedance of the transistors $Q_1$ and $Q_2$ is high so that the load resistance $R_L$ can be large enough for the conversion of the current signal $i_3$ to a voltage (proportional to the product of $i_1$ and $i_2$) of practical level. This output voltage may be taken from between terminals *c* and *d*, *e* and *f*, or *d* and *e*, as desired.

In the case of both the diodes, $D_1$ and $D_2$, and the transistors, $Q_1$ and $Q_2$, the exponential transfer function is of the form exp. $(qV/AkT)$, where V is the applied voltage, $q$ is the electronic charge, $k$ is Boltzmann's constant, T is the absolute temperature of the semiconductor junction, and the coefficient A is the logarithmic slope.

For maximum accuracy, it can be shown that the coefficient A of the diodes should be equal to twice the coefficient A of the transistors. First-order temperature errors are eliminated by keeping all the components at the same temperature (as by a common heat sink). Second-order temperature errors depend upon the difference in the magnitude of base-emitter voltage developed across each transistor, again emphasising the desirability of matching the characteristics of the two transistors.

In a prototype unit, $D_1$ and $D_2$ were FD 600 planar switching diodes (with $A=2$ over a wide range), and $Q_1$ and $Q_2$ were 2N1711 and 2N1132 planar transistors (with $A=1$ over a wide range). In this case, the output current $i_3$ is equal to the product $i_1.i_2$ of input current times a scale factor approximately equal to 0.35. With one input held constant at 0.5 ma. and the other input varied over a range of 4 ma., the output error was less than 0.3%. With carefully matched components, errors of less than 0.1 percent of full scale should be readily obtainable. The transient response time to an input step function was less than 100 nanoseconds across a 2.2K resistor, corresponding to an operating frequency range from D.-C. to greater than 5 mc.

Figure 2:
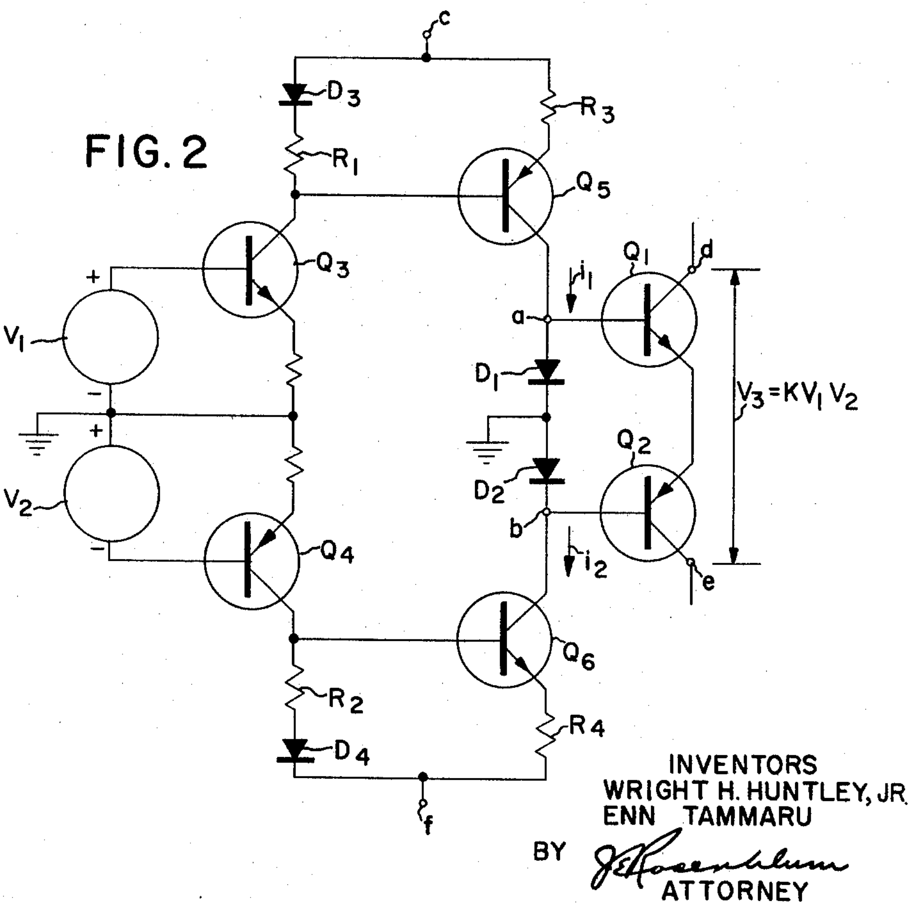
FIGURE 2 is a schematic drawing of a circuit useful for driving the multiplier circuit of FIGURE 1.

It is often desirable to provide a capability for providing inputs as voltages rather than currents. A suitable circuit for achieving this is shown in FIGURE 2. Voltage-to-current converting transistors $Q_5$, $Q_6$ are coupled to input voltages $V_1$, $V_2$ via preceding stage transistors $Q_3$, $Q_4$ with nonlinear collector loads $R_1$ and $D_3$, $R_2$ and $D_4$. The currents $i_1$ and $i_2$ so generated are introduced into the circuit of FIGURE 1 to yield an output $V_3=kV_1V_2$, where $k$ is a constant. By appropriately matching resistors $R_1$ and $R_3$, $R_2$ and $R_4$, the extra voltage drop across the nonlinear load at low currents can be made to cancel the corresponding extra voltage drop across the base-emitter junction of the converters $Q_5$, $Q_6$, thus averting a potential error at low signal levels. In addition the thermal voltage variations of the diodes $D_3$, $D_4$ compensate for those of the converters $Q_5$, $Q_6$. It is worth noting that the entire circuit of FIGURES 1 and 2 can typically be packaged in a volume of 0.5 cu. in. or less. A presently available commercial multiplier with half the accuracy, 1 percent of the frequency response, and 0.5 percent of the dynamic range of the circuit of the present invention, requires a volume of nearly 600 cu. in. and weighs 7 pounds.

For reasons such as further miniaturization and enhanced thermal stability it may be desirable to form the diode and transistor circuit components from a single block of semiconductor material.

Figure 3:
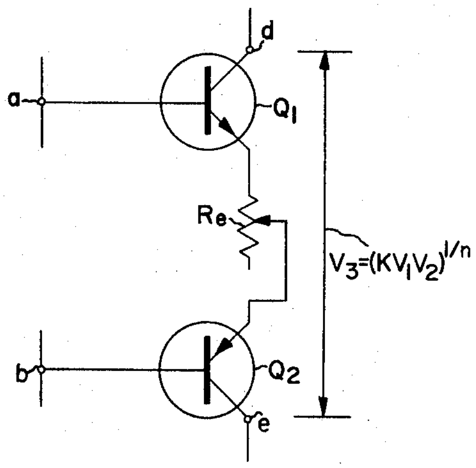
FIGURE 3 is a schematic drawing of a modification of the circuit of FIGURE 1 for enabling the output product function to be raised to a fractional exponent.

FIGURE 3 shows a modification of FIGURES 1 and 2 in which a variable resistor $R_e$ is inserted between the emitters of the output transistors $Q_1$ and $Q_2$. The effect of this resistor is to modify the circuit transfer function so as to raise the output product function to a fractional exponent $1/n$, $n>1$. Thus, for example, the resistance $R_e$ may be varied to give $n=2/5$ so that the circuit may be used to give a completely linear intensity control in an oscilloscope which obeys a 5/2-power beam current law.

We claim:

1. A solid-state analog multiploer circuit comprising: a pair of semiconductor junction diodes, opposite polarity terminals of said diodes being connected to a common potential point so that input currents through said diodes develop a voltage at the remaining diode terminals which varies as the sum of the logarithms of the currents through each of said diodes; and a floating-input, complementary pair of transistors, said voltage being impressed across the base-emitter junctions of said transistors so that the output collector current of said transistors varies in accordance with the antilogarithm of said voltage.

2. A circuit according to claim 1 including a circuit for converting input voltage signals into said diode currents, said latter circuit comprising a pair of voltage-to-current converting transistors coupled to said voltage input signals via a pair of preceding-stage transistors with nonlinear collector loads.

3. A circuit according to claim 1 including a resistor connected between the emitters of said complementary pair of transistors, said resistor functioning to raise the collector output thereof to a fractional exponent.

4. A circuit according to claim 1 wherein the logarithmic slope of the transfer function of said diodes is equal to substantially twice the logarithmic slope of the transfer function of said transistors.

References Cited by the Examiner

UNITED STATES PATENTS 3,206,619 9/1965 Lin ---------------- 307—88.5

MALCOLM A. MORRISON, *Primary Examiner.*

M. P. HARTMAN, *Assistant Examiner.*